(12) United States Patent
Gallagher et al.

(10) Patent No.: US 6,670,988 B1
(45) Date of Patent: Dec. 30, 2003

(54) METHOD FOR COMPENSATING DIGITAL IMAGES FOR LIGHT FALLOFF AND AN APPARATUS THEREFOR

(75) Inventors: Andrew C. Gallagher, Rochester, NY (US); Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/293,197

(22) Filed: Apr. 16, 1999

(51) Int. Cl.[7] ............................. H04N 9/73; H04N 9/64
(52) U.S. Cl. ..................... 348/224.1; 348/251
(58) Field of Search ................ 348/224.1, 251

(56) References Cited

U.S. PATENT DOCUMENTS

| | | | | |
|---|---|---|---|---|
| 4,583,186 A | * | 4/1986 | Davis et al. | 89/17 |
| 4,734,783 A | * | 3/1988 | Horikawa | 358/448 |
| 4,816,663 A | * | 3/1989 | Utagawa et al. | 250/201.2 |
| 4,845,551 A | * | 7/1989 | Matsumoto | 358/506 |
| 4,945,406 A | | 7/1990 | Cok | |
| 4,979,042 A | * | 12/1990 | Vogel | 348/251 |
| 5,134,573 A | | 7/1992 | Goodwin | |
| 5,253,083 A | * | 10/1993 | Hirota | 358/461 |
| 5,303,056 A | * | 4/1994 | Constable | 386/130 |
| 5,343,302 A | * | 8/1994 | Yamashita | 348/251 |
| 5,461,440 A | | 10/1995 | Toyoda et al. | |
| 5,659,813 A | * | 8/1997 | Kusaka et al. | 396/111 |
| 5,822,453 A | | 10/1998 | Lee et al. | |
| 6,141,046 A | * | 10/2000 | Roth et al. | 348/251 |
| 6,181,830 B1 | * | 1/2001 | Sato | 382/274 |
| 6,323,934 B1 | * | 11/2001 | Enomoto | 355/40 |
| 6,339,466 B1 | * | 1/2002 | Matama | 355/52 |

FOREIGN PATENT DOCUMENTS

WO    WO 93/04442    3/1993

* cited by examiner

*Primary Examiner*—Wendy R. Garber
*Assistant Examiner*—James Hannett
(74) *Attorney, Agent, or Firm*—Thomas H. Close

(57) ABSTRACT

A method for compensation at least one digital image for light falloff. The digital image may be generated for example from a conventional image frame on a film roll. A plurality of pixel values is provided for each of at least one digital image. A light falloff compensation function is applied and according to that a light falloff correction parameter is determined. Both the light falloff compensation function and the light falloff correction parameter are used to generate an individual compensation value for each pixel element. The compensation value is applied to each pixel element. The method is also able to differentiate and correct the images according to light falloff generated by pure lens falloff or a light falloff generated by the lens and the flash falloff.

15 Claims, 7 Drawing Sheets

METHOD FOR COMPENSATING DIGITAL IMAGES FOR LIGHT FALLOFF AND AN APPARATUS THEREFOR

FIELD OF THE INVENTION

The invention relates generally to the field of digital image processing and, more particularly, for compensating an image for light falloff. The light falloff may be a composed of lens and/or flash falloff.

BACKGROUND OF THE INVENTION

Lenses produce non-uniform exposure at the focal plane when imaging a uniformly lit surface. For instance, the light from a uniformly lit gray wall perpendicular to the optical axis will pass through a lens and form an image that is brightest at the center and dims radially. The intensity of light in the image will form a pattern described by $\cos^4$ of the angle between the optical axis, the lens, and the point in the image plane.

In addition, other factors such as vignetting contribute to the lens falloff phenomena. Vignetting is a property that describes the loss of light rays passing through an optical system.

In the traditional optical photographic system, every image captured on a negative contains some component of lens falloff. The lens of an optical printer also introduces lens falloff during the printing process. However, this falloff occurs to the negative of the original scene, and thus has the effect of providing a means of partial falloff compensation.

Digital printers have no such built in falloff compensation. In fact, digital printers are calibrated such that a uniform field is produced by printing an image of uniform code values. Consequently, a need exists for a method of compensating a digital image for the lens falloff that occurred at the time of image capture in a similar manner to the traditional photographic printer.

In general, the level of falloff compensation corrected by the optical printer is less than the amount of falloff that the optics of the capture device cause. For this reason, there is a need to compensate specifically for the falloff that the capture system induces into the captured scene.

Several examples exist in the prior art which teach methods of compensating an image for the lens falloff that occurred at the time of capture. In U.S. Pat. No. 5,461,444, Toyoda et al describe a method of recording camera identification code onto the film upon which the image is also captured. This identification code specifies the lens information (focal length, focus position, and aperture value). During digital processing, the identification code is translated by look-up-table to a required level of correction which is applied to the image.

However, it is not always practical or possible to record such information onto photographic film. Consequently, the need exists to compensate for levels of lens falloff in a captured scene with less knowledge about the camera's optical system at the time of image capture.

In addition, when a flash is used in order to provide more illumination on a scene, there is often observed in the output image an effect similar to lens falloff. Consequently, there exists a need to create a flash falloff compensation for those scenes where flash falloff degrades image quality.

Consequently, a need exists for overcoming the above-described drawbacks. More specifically, a need exists for applying a lens and flash falloff correction without the need of the knowledge of the specific focal length, aperture, and focus position.

SUMMARY OF THE INVENTION

It is the object of the present invention to provide a method directed to overcoming one or more of the problems as set forth above. Briefly summarized, according to one aspect of the present invention, the invention resides in providing a correction of the light falloff without the need to provide specific data about the focal length, the aperture and the focus position of the picture taking device.

The object stated above is accomplished by a method for compensating at least one digital image for light falloff comprising the steps of:

provides a plurality of pixel values for each of at least one digital image;

providing a light falloff compensation function;

determining a light falloff correction parameter;

using the light falloff compensation function and the light falloff correction parameter to generate an individual compensation value for at least one pixel value; and applying the individual compensation value to at least one pixel value.

It is a further object of the present invention to provide an apparatus which outputs at least one image compensated for light falloff. The method is accomplished by an apparatus for compensating at least one digital image for light falloff, the apparatus comprises: a digitizing device to provide at least one digitized image frame; a light falloff compensator for applying an individual compensation value to at least one pixel element; a light falloff compensation mask is generated by a light falloff compensation function and a light falloff correction parameter to generate the individual compensation values for each pixel element; and a rendering device for providing a visual representation of an image compensated for light falloff.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The subject matter of the invention is described with reference to the embodiments shown in the drawings.

DETAILED DESCRIPTION OF THE INVENTION

In the following description, the present invention will be described in the preferred embodiment as a method. Those skilled in the art will readily recognize that the equivalent of such a method may also be constructed within the scope of the invention.

Figure 1:
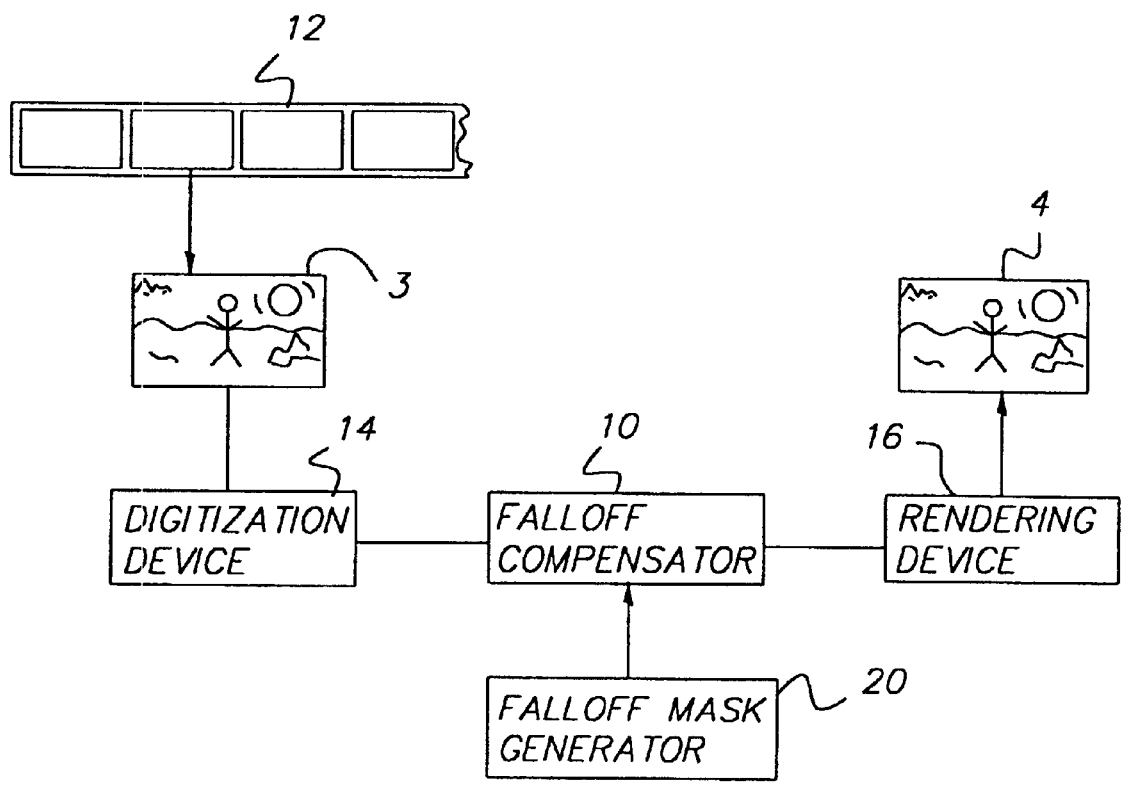
FIG. 1 is a schematic representation of the system providing falloff free pictures.

Referring to FIG. 1, there is illustrated an overview of the present invention. It is instructive to note that the present invention utilizes at least one digital image 2 which is typically a two-dimensional array of red, green, and blue pixel values, or a single monochrome pixel value corresponding to light intensities. The digital image 2 is in the form of digital image data (see FIG. 3), which are used for further processing. A digital camera (not shown) may be the source for digital image 2. In addition to that the digital image 2 may be generated from a conventional film roll 12, like the Advanced Photo System (APS), 35 mm film or any other film format. Therefore, at least one film frame 3 of the film roll 12 is subjected to a digitizing device 14. The digitizing device 14 may have the form of a film scanner which transforms each of the frames on the film roll 12 into a digital representation thereof. The digital device 14 may also be the image sensor of a digital camera or even a flatbed scanner for digitizing positive prints. The so generated digital image data are fed to a falloff compensator 10. After the compensation of the falloff, a rendering device 16 displays or prints the falloff compensated image 4. The rendering device may take several forms which are suitable to display or print the falloff compensated image 4. The rendering device may be a display, a CRT tube, a digital printer, an inkjet printer, or a combination therefrom.

The metric of the image data described by this invention is assumed to be log exposure. An alternative embodiment of the present invention may be implemented if the metric of the image data of the input image is in fact linearly related to exposure.

As explained below, the light falloff may have its origin in a lens falloff and, if a flash is used during picture taking, also in a flash falloff. The light falloff in at least one digital image 2 is compensated by carrying out alterations on at least one pixel value of one digital image 2. At first, a plurality of pixel values of one digital image 2 has to be provided. As mentioned above various film roll types (Advanced Photo System or 35 mm) may be used. A light falloff compensation function fcf is provided and at least a light falloff correction parameter f is calculated to generate a light falloff compensation mask, which provides the best light falloff compensation. Additional parameters may have an influence on the light falloff compensation and are discussed in the various embodiments of the invention. For a more detailed description of the parameters see the specification below. The light falloff compensation function fcf and the light falloff correction parameter f enables a calculation of a compensation value for each pixel element $p_{ij}$ of the digital image 2. It is clear for a person skilled in the art, that there is no need to apply the compensation value to each pixel element $p_{ij}$. The compensation value can be applied to selected pixel elements. In the following description the compensation value, individual for each pixel $p_{ij}$, is applied to each pixel element $p_{ij}$ and the result is a light falloff corrected image. As described later, there is also the possibility to calculate the compensation value for each pixel element $p_{ij}$ according to a light falloff compensation function fcf which comprises uniform areas bigger than the a single pixel of the digital image generation device. It is clear that a reduction in the number of pixels being subjected to the calculation process saves processing time.

To carry out the process, the digital image data of the digital image 2 is passed into the falloff compensator 10. The falloff compensator 10 performs a pixel by pixel summation of the input image data with the corresponding compensation value for each pixel element $p_{ij}$ generated by the falloff mask generator 20 by evaluating the light falloff compensation function fcf. In other words, the light falloff compensation function fcf is evaluated to produce a light falloff compensation mask, defined as a two-dimensional representation of compensation values to be applied to the respective pixel elements $p_{ij}$ of the digital image 2. Pixel by pixel addition or multiplication is well known in the art and will not be further discussed. Accordingly, the resulting output from the falloff compensator 10 has been compensated for light falloff. As mentioned above the light falloff in the original image may be caused by lens falloff, flash falloff or a combination of both.

Figure 2:
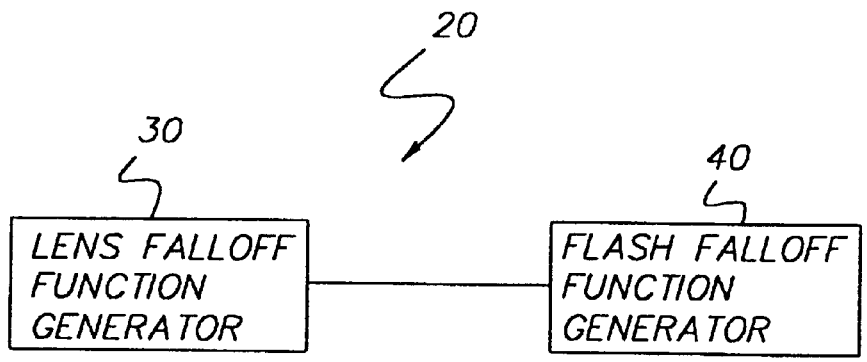
FIG. 2 is a representation of the components of the falloff mask generator from FIG. 1.

Referring to FIG. 2, therein is illustrated a more detailed view of the falloff mask generator 20. The light falloff compensation function fcf is designed to be symmetric about the horizontal and vertical axes of the original image. The light falloff compensation function fcf is a composite of two falloff compensation functions, each compensating for a specific source of falloff. A first falloff compensation function compensates for lens falloff. The lens falloff compensation function lfcf is generated by a lens falloff function generator 30. A second light falloff compensation function compensates for flash falloff. The flash falloff compensation function ffcf and is generated by a flash falloff function generator 40.

Both, the lens falloff compensation function, lfcf, and the flash falloff compensation function, ffcf, may be described mathematically as functions of the position in the original image. Both the lens falloff compensation function lfcf and the flash falloff compensation function ffcf are evaluated for the number of lines and pixels as the original image passed to the falloff compensator 10.

Figure 4:
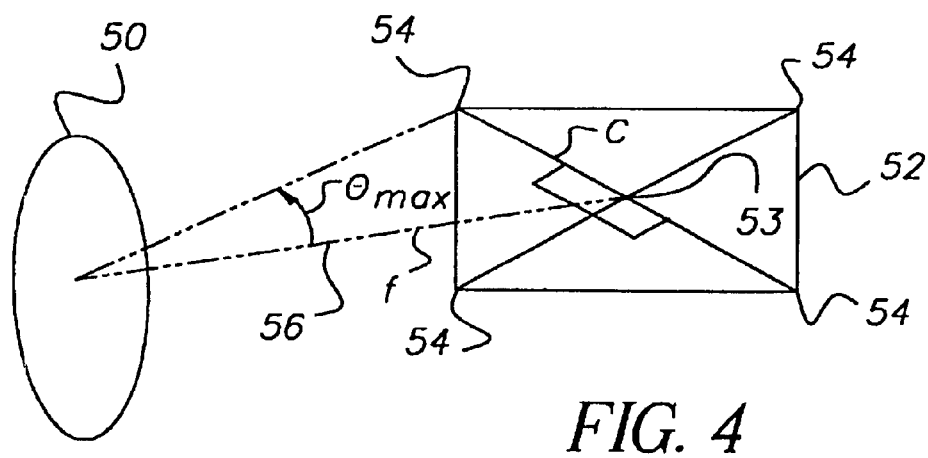
FIG. 4 is a schematic set-up for the calculation of the lens falloff.
Figure 5:
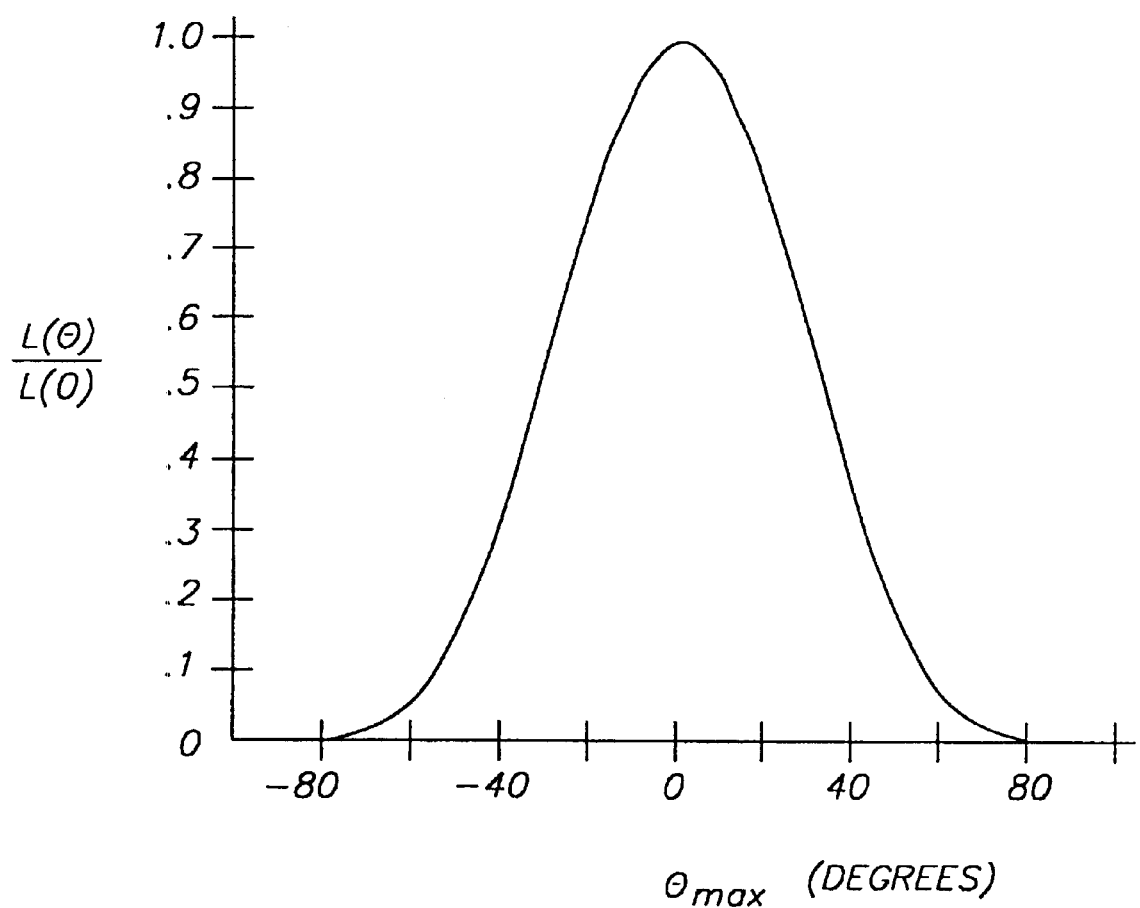
FIG. 5 is a normalized, one-dimensional representation of the lens falloff.

In the preferred embodiment the lens falloff compensation function lfcf is defined in equation 1. Practically, in a camera system with lenses, the falloff results in non-uniform exposure to the film or image sensor. The necessary parameters for calculation of the falloff at each position on a film plane or image plane is shown in FIG. 4. A lens 50 images a scene onto the film frame 3 or an image sensor 52. A maximum angle $\Theta_{max}$ occurs in each corner 54 of the film frame 3 or the image sensor 52 and is known as the semi-field angle. For any given camera, the maximum angle $\Theta_{max}$ (equation 2) may be calculated as:

$$lfcf = -[1000 \log_{10} \cos^4 \Theta] \qquad \text{Equation 1}$$

$$\Theta_{max} = \tan^{-1}\left(\frac{c}{f}\right) \qquad \text{Equation 2}$$

where:
  f is an additional parameter and in some cases it can be the focal length of the lens used to image the scene onto the film frame 3 or image sensor 52. c is the diagonal distance from a center 53 of the film frame 3 or image sensor 52 to the corners 54 thereof. The ratio of exposure in a corner 54 of the image to the exposure on an optical axis 56 defined by the imaging lens 50 is expressed in equation 3. A one-dimensional plot of equation 3 is shown in FIG. 5.

$$\frac{L(\Theta_{max})}{L(0)} = \cos^4\left[\tan^{-1}\left(\frac{c}{f}\right)\right] \quad \text{Equation 3}$$

where $L(\Theta_{max})$ is the exposure in the corners 54 of the film frame or the image sensor 52 and $L(0)$ is the exposure in a center of the film frame or the image sensor 52 defined by the optical axis 56.

Table 1 shows an evaluation of the expression in equation 2 for some different camera systems.

TABLE 1 cos⁴ falloff in common cameras

| | Focal length (mm) | Frame size (mm) | $\Theta_{max}$ (rad) | $\frac{L(\Theta_{max})}{L(0)}$ | stops | 1000 log (E) |
|---|---|---|---|---|---|---|
| 35 mm SUC | 32 | 24 × 36 | 0.59 | 0.47 | 1.1 | 326 |
| 35 mm SLR | 50 | 24 × 36 | 0.41 | 0.71 | 0.49 | 148 |
| 35 mm SLR zoom | 80 | 24 × 36 | 0.26 | 0.87 | 0.2 | 61 |
| APS SUC | 23 | 16.7 × 30.2 | 0.64 | 0.41 | 1.3 | 386 |

The 4th column of data in Table 1 shows the estimated relative exposure resulting from identical radiances imaged through the optical lens 50. The remaining columns all display that same data in other metrics. The 5th column shows the falloff in terms of photographic stops. Merely because of the lens falloff, the corners of a film frame 52 in a Single Use Camera (SUC) is over 1 stop down from the center of the image. This value is converted to logE by converting with the factor 300 logE/stop.

In most prints, the result of this falloff is not easily detected on a single stimulus basis. There are several reasons for this. First, the falloff occurs as a very low spatial frequency. For a 4 inch×6 inch print, the falloff is in the range of 0.10 cycles/inch to 0.05 cycles/inch (at standard viewing distance of 14 inches this becomes 0.025 cycles/degree to 0.014 cycles/degree.) The human eye is not especially sensitive to frequencies in this range. Most scenes with a moderate amount of detail will hide the falloff from human perception. However, the falloff is often noticeable in photographs of a clear blue sky (see FIG. 11). The corners of the image will appear in a much darker blue than the sky nearer the center of the print. In such cases, the falloff is quite obvious and objectionable.

Another reason that photographic prints often do not appear to have falloff is a result of the optical printing process. The optical printer also contains a lens with geometric falloff. Because this lens falloff occurs to the negative, the overall effect of the falloff incurred by the printing process will partially compensate for the falloff generated by the lens or optical system of the camera. If the falloff profile of the printer lens exactly matches the falloff profile of the camera lens, a system free of lens falloff will result. However, the $L(\Theta_{max})/L(0)$ ratio is typically about 0.85 for a conventional photographic printer. This means that the majority of cameras introduce more falloff into the imaging process than the printer is capable of correcting.

A digital printer requires a correction of the image signals for light falloff before the image is printed on a receiving medium. The digital correction for the lens falloff is done with equation 1. Here, an individual compensation value is calculated for every pixel of the image passed to the falloff compensator 10. Where $$\Theta = \tan^{-1}\left(\frac{d}{f}\right)$$

d is the distance in pixels of a particular point from image center 5. f is an additional parameter, in some cases it is the focal length in pixels of the imaging lens 50. As shown below, f can also be a fit parameter. In this case a plurality of film frames are used to find an averaged light falloff compensation function, thereby f is varied to provide the best fit for the overall light falloff compensation function. d is calculated according to equation 4. The distance d is measured in pixels.

$$d = \sqrt{\left(x - \frac{x_{max}}{2}\right)^2 + \left(y - \frac{y_{max}}{2}\right)^2} \quad \text{Equation 4}$$

x is the coordinate of the pixel in the x-direction of the digital image 2 and y is the coordinate of the pixel in the y-direction of the image 2. $x_{max}$ and $y_{max}$ are the maximum dimensions of the digital image 2 in the x-and y-direction respectively.

Figure 3:
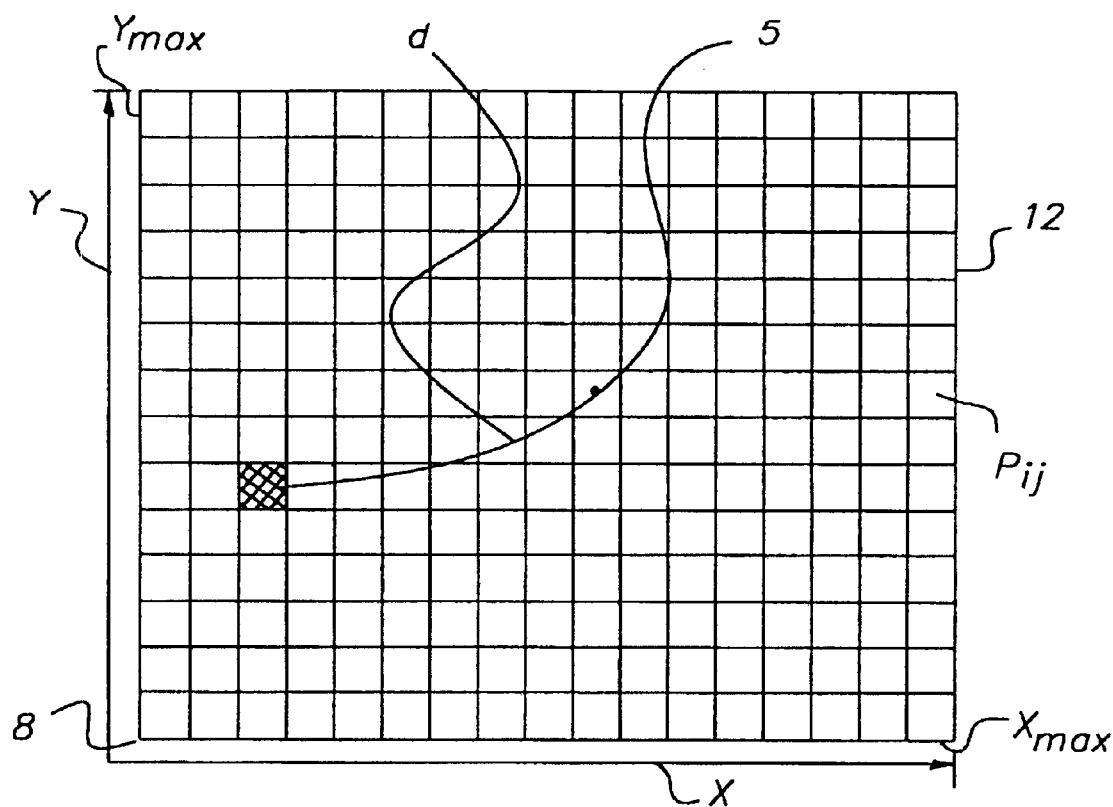
FIG. 3 is a simplified two-dimensional representation of the plurality of pixel elements responsible for the image content.

As mentioned above the digital image 2 is represented by a two-dimensional array of red, green, and blue pixel values. FIG. 3 is a simplified representation of the two dimensional of the plurality of pixel elements $p_{ij}$. Here i is the number of a pixel in the x-direction and j is the number of a pixel in the y-direction. For the sake of simplicity only one type (for example the blue one) of pixel elements $p_{ij}$ is considered. A center 5 is defined in each digital image 2. The distance d from the center 5 is calculated according to the above equation wherein x is the distance of the pixel (see hatched pixel in FIG. 3) from a bottom left hand corner 8 in the x-direction of the digital image 2 and y is the corresponding distance in the y-direction. $x_{max}$ and $y_{max}$ are the maximum dimensions of the digital image 2 in the x and y-direction. The digital image 2 is for example generated by a scanner (not shown) which is used to convert visual image information of an image frame into the corresponding digital image data of the image frame. It is clear for a person skilled in the art that scanner may also be used to scan entire film rolls. Additionally the scanner should not be limited to a special film format.

Thus, as mentioned previously, f is an unknown parameter. f is regarded as the light falloff correction value and its determination enables the precision of an individual correction value for each pixel value. The following description provides various possibilities to determine the falloff correction parameter.

Firstly, the value of f may be selected in order to approximate the falloff compensation that was implicit in an optical photographic system. This means, that the calculating step of the light falloff compensation function fcf is carried out with a focal length f of a typical optical photographic printer. Here the light falloff compensation parameter f is equivalent to the focal length f of the optical printer. In a typical optical photographic printer, the image irradiance at the corner 54 of the image is approximately 85% of the irradiance at the center 5 of the digital image 2. In order to approximate this level of implicit falloff compensation with the method of the present invention, the value of f must be 3.62* $d_{max}$, where $d_{max}$ is the distance of the image corner to the image center 5 (i.e. $x=x_{max}$ and $y=y_{max}$).

In addition, the light falloff compensation function fcf is determined by the focal length f of the digital image capture lens. In order to get the best correction, an operator may simply adjust a slider of a graphical user interface, which applies a light falloff compensation function fcf, generated with any number of choices for the focal length f. The operator may adjust the slider until he is pleased with the results. The resulting value for the focal length f is served and input to the lens falloff function generator 30 as the falloff correction parameter.

In addition, f may be defined by the format of a photographic film, the at least one digital image is generated from. The scanner or digital image generating means may determine format of the photographic film. The film format provides information about the camera used for picture taking. For instance, assuming that the film format is known, (i.e. APS or 35 mm), the value for f may be selected that it is appropriate for a wide variety of camera types of the specified format. In general, the value for f appropriate for APS cameras is smaller than the value of f appropriate for 35 mm film cameras (see Table 1).

In addition, if the camera type (i.e. single use camera, point and shoot, single lens reflex) is known, an even more appropriate value for f may be chosen. The camera type may be determined by the photographic printer, which has means to read or detect camera information somewhere on the photographic film. Additionally, the film rolls exposed by the various camera types may be processed on separate printers. This makes it easy to set a special f-value for the various camera types (see Table 1). For instance, the value of f should be smaller for single use camera images than single lens reflex cameras, since in general, single use camera lenses have shorter focal lengths than single lens reflex camera lenses.

A further possibility to determine the light falloff compensation parameter f for the lens falloff is done by an analysis of the pixel values of the images. For example, images on a single roll 12 of a photographic film are analyzed. It is assumed that the images are taken with the same imaging device.

Figure 6:
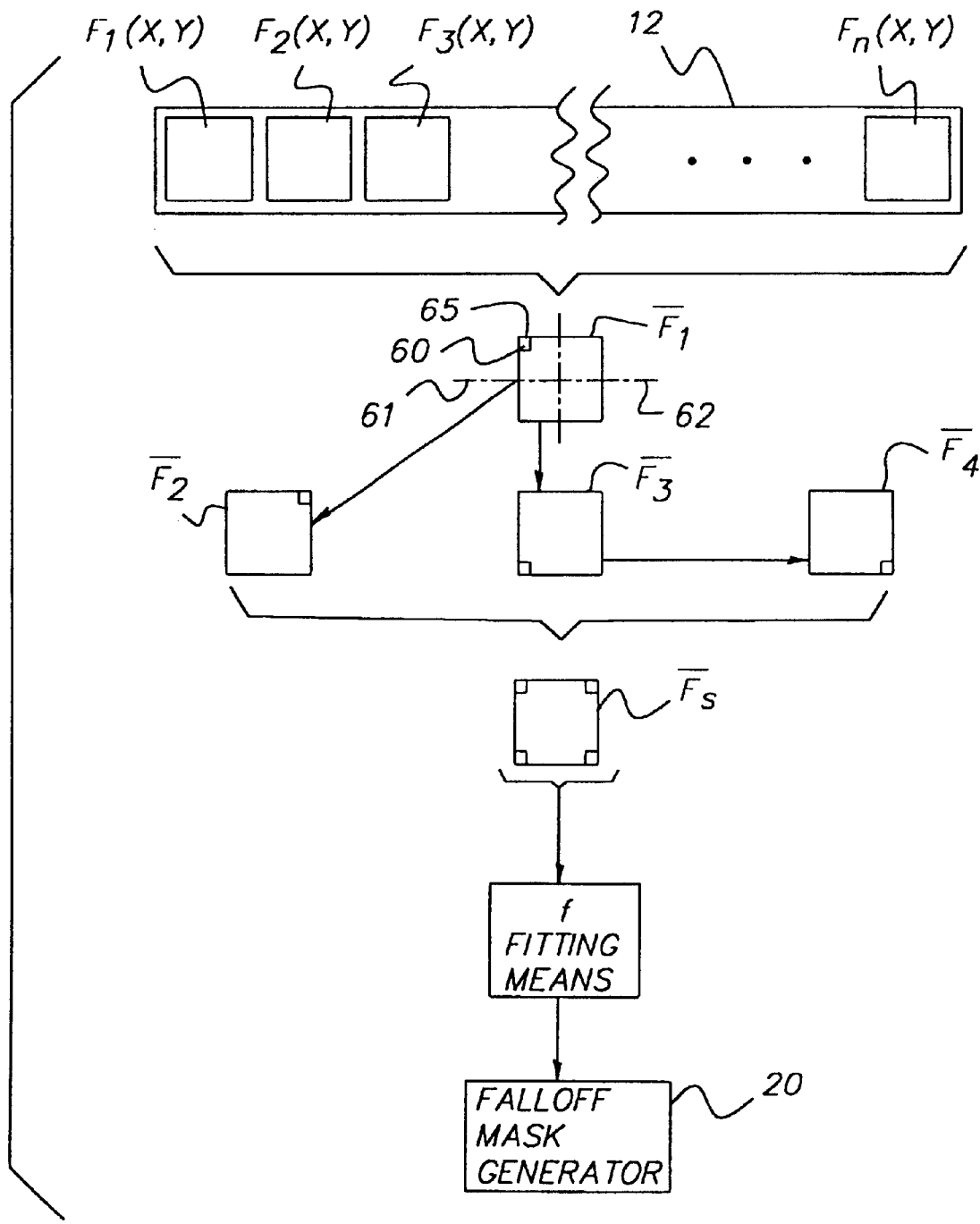
FIG. 6 is a graphical representation of the determination of the light falloff correction value according to the averaged frame of an entire film roll.

According to this method, an average frame for all the frames $F_1(x,y), F_2(x,y), \ldots, F_n(x,y)$ on one roll 12 may be calculated. A pixel value 65 of a first average frame $\overline{F}_1$ at a specific location is computed by averaging together the pixel values of all frames at that same location (for example the specific location may the upper right hand corner 60, see FIG. 6). Once computed, the first average frame $\overline{F}_1$ is forced to have symmetry about a vertical axis 61 and a horizontal axis 62 in the following manner. Three more images (averaged frames) are generated from the first average frame $\overline{F}_1$ by reflecting about the horizontal axis 61, the vertical axis 62, and both the horizontal and the vertical axes 62 and 61 respectively. As a result of this process one obtains a second average frame $\overline{F}_2$, which is the first average frame $\overline{F}_1$ flipped about the horizontal axis 61, a third average frame $\overline{F}_3$, which is the first average frame $\overline{F}_1$ flipped about the horizontal axis 61 and a fourth average frame $\overline{F}_4$, which is the second average frame $\overline{F}_2$ flipped about the vertical axis 62. The four average frames $\overline{F}_1, \overline{F}_2, \overline{F}_3$ and $\overline{F}_4$ are then averaged together in order to generate a symmetric average frame $\overline{F}_S$.

A $\cos^4$ surface is then fit to the symmetric average frame $\overline{F}_S$. In this regard, many $\cos^4$ falloff surfaces are generated by varying the parameter f and the offset m in Equation 5. fit(x, y) is comparable to equation 1. The result of the best fit here provides a value for f, the light falloff correction parameter.

$$fit(x, y) = 1000 \log_{10} \cos^4\left[\tan^{-1}\left(\frac{d}{f}\right)\right] + m \quad \text{Equation 5}$$

The fit(x,y) which produces the minimum least squared error with reference to the symmetric average frame is the optimal fit. The error E of an ideal $\cos^4$ surface and the symmetric average frame, $\overline{F}_S(x,y)$ may be calculated with the following formula:

$$E = \sum_{x,y} [fit(x, y) - \overline{F}_s(x, y)] \quad \text{Equation 6}$$

The value of the parameter f used to generate the falloff compensation function fcf is then set to the f which was used to produce the optimal fit. Search routines and optimization techniques exist that accomplish efficient locations of the values of f and m that minimize the least squared error E.

Figure 7:
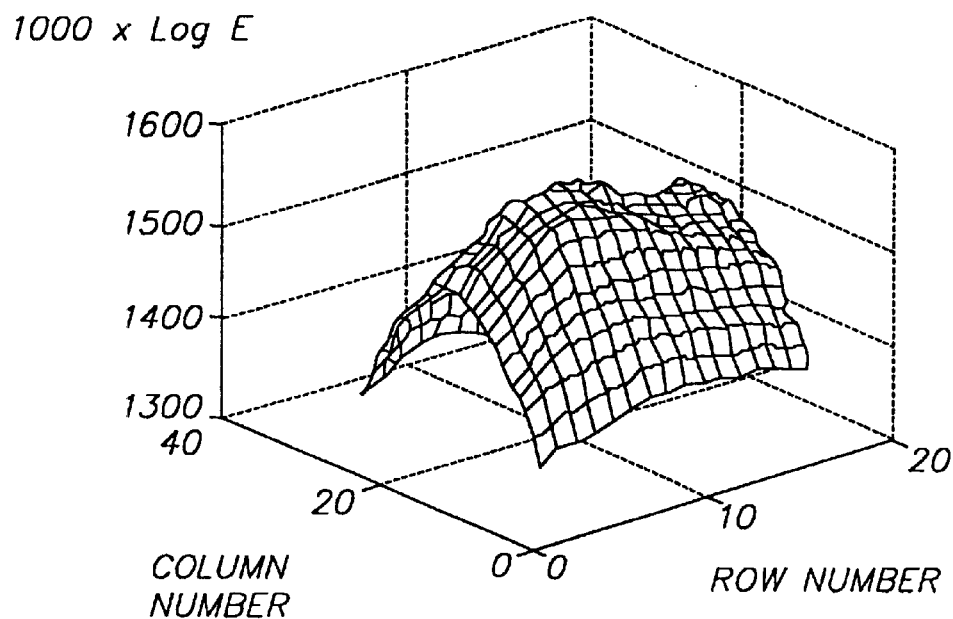
FIG. 7 is a graphical representation of intensity distribution in an average frame.

FIG. 7 is a graphical representation of intensity distribution (in 1000×log E) in an average frame. In this specific example sub-samples of 64 times 64 pixels are formed from the digital image, which comprises for example 1024 times 1536 pixel elements. According to the sub-sampling one ends up with a digital image comprising 16 times 24 image blocks for the average frame. It is clear for a skilled person that other sizes of the sub-samples may be chosen and consequently their selection is obvious. The number of image blocks governs the time necessary for any calculation. So the fewer the blocks or pixels of an image to be considered the faster the result for the required parameter for the falloff compensation function.

Figure 8:
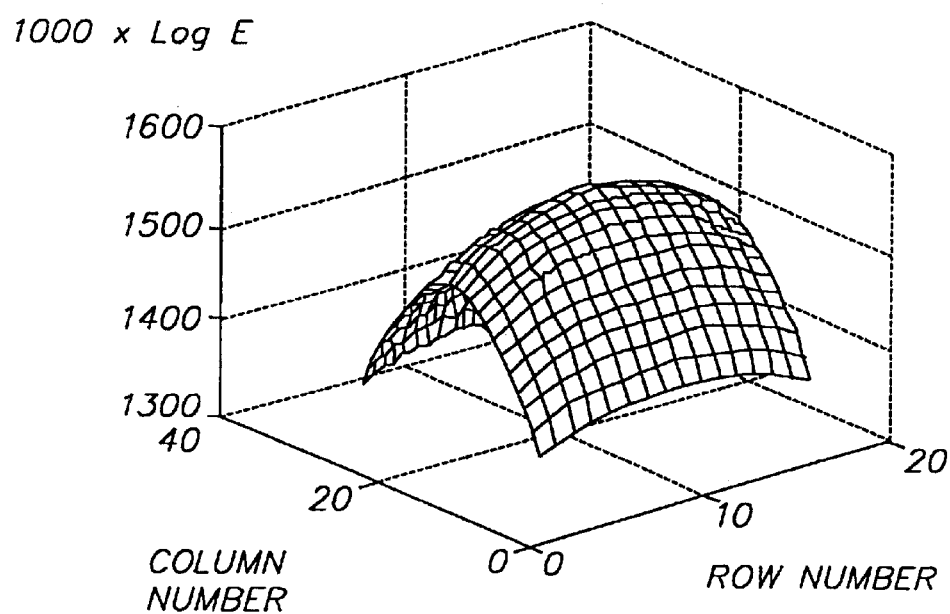
FIG. 8 is a graphical representation of intensity distribution in a symmetric average frame.
Figure 9:
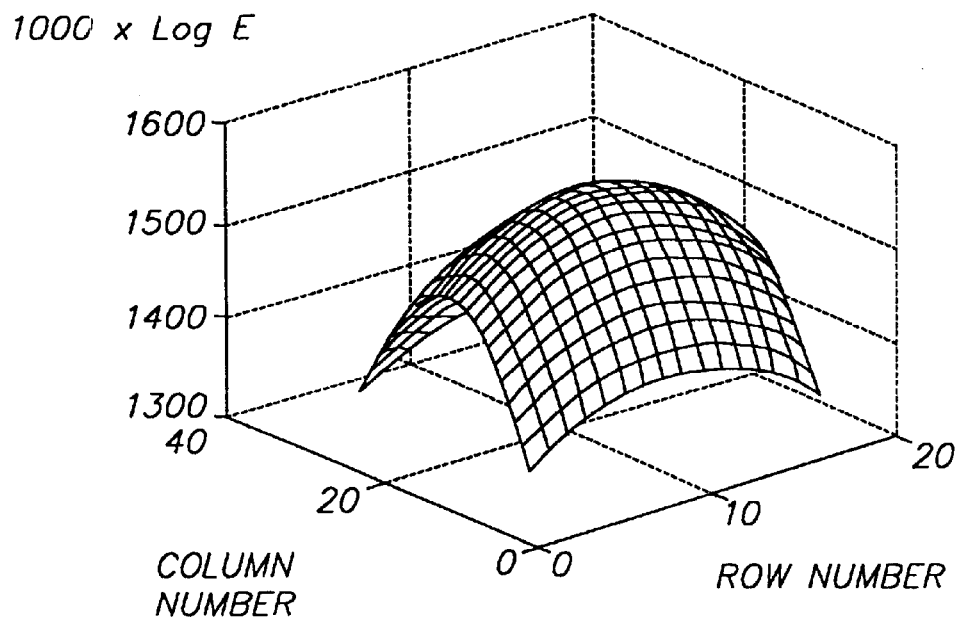
FIG. 9 is a graphical representation of a fitted $\cos^4$ surface in order to provide the fit-parameter f.
Figure 10:
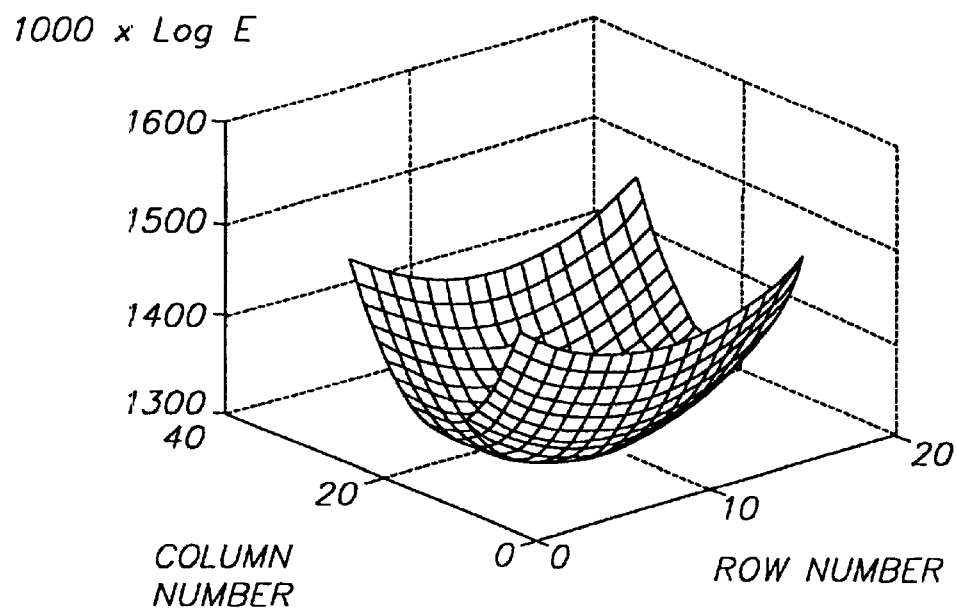
FIG. 10 is a graphical representation of a light falloff compensation mask, which is applied to the pixel values of each image frame on a film roll.

According to the above sub-sampling the intensity distribution in the symmetric average frame $\overline{F}_S$ is shown in FIG. 8. The determination of the average image frame $\overline{F}_S$ is done with the same size of sub-samples as used in FIG. 7. The average image frame $\overline{F}_S$ is fitted to a $\cos^4$ surface in order to provide a fit-parameter $f_{sub}$. A graphic representation of the average image frame $\overline{F}_S$ fitted to the $\cos^4$ surface is shown in FIG. 9. $f_{sub}$ is related to the parameter f for the real image by the size of the sub-samples (for this example: $f=64\times f_{sub}$). The graphical representation of a light falloff compensation mask is shown in FIG. 10. This is a three dimensional representation of the compensation values, which are applied to associated pixel values of each image frame on said film roll 12, from which the average image frame $\overline{F}_S$ is generated form.

Figure 11:
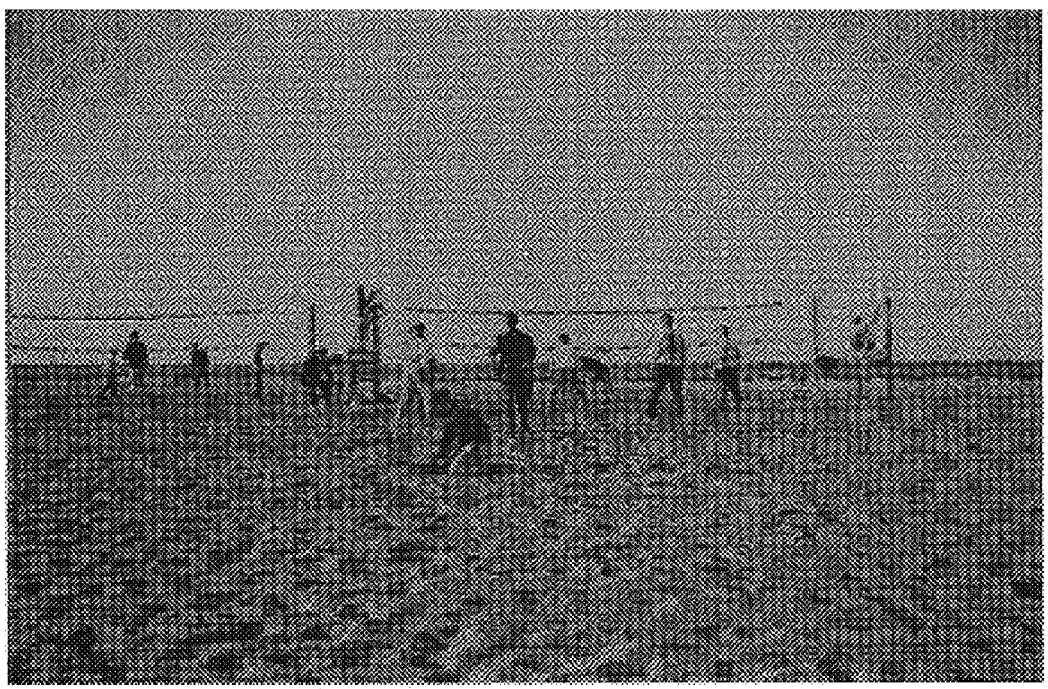
FIG. 11 is a real image before a compensation for light falloff is carried out.
Figure 12:
FIG. 12 is a real image after the compensation for light falloff is carried out.

FIG. 11 is a representation of an image before the compensation for light falloff has been carried out. In contrast to that the compensated image (FIG. 12) shows a major improvement in image quality. The image (FIG. 11) before the compensation is darker at its corners as in its center. This image defect is caused by the discussed light falloff. The compensation for light falloff furnishes an image, which is free from the light falloff defect. The image (FIG. 12) shows an even exposure. The result of compensation as shown in FIG. 12 is done with the above method of generating an average image frame $\overline{F}_S$ from a single film roll.

Finally, if the source of the image is unknown, then a conservative estimate may be made for the light falloff correction parameter f in order to avoid over-compensation. The estimate is done by selecting f such that lfcm(0,0)=C wherein C is a constant value. In a preferred embodiment the constant C=150 code values assuming the data matrix is 1000log Exposure.

As mentioned earlier, a further component contributing to the light falloff compensation arises form the light falloff caused by the firing of a flash. The flash falloff compensation function, ffcf, is also described as a mathematical function of location in the image. In general, the flash falloff compensation function ffcf is of greater magnitude than the lens falloff compensation function lfcf (in other words, generally ffcf(0,0)>lfcf(0,0).

Flash falloff generally may not be radially symmetric with respect to the center of the image. In the preferred embodiment, the flash falloff compensation function ffcf may be described by the following equation 7:

$$ffcf(x,y) = -[1000\log_{10} \cos^4 \Theta_2]$$ Equation 7

Where:

$$\Theta_2 = \tan^{-1}\left(\frac{d_2}{f_2}\right)$$

$d_2$=normalized distance from image center 5 to any point in the image plane. $d_2$ is calculated according to equation 8

$$d_2 = \sqrt{\left(\frac{2\left(x - \frac{x_{max}}{2}\right)}{x_{max}}\right)^2 + \left(\frac{2\left(y - \frac{y_{max}}{2}\right)}{y_{max}}\right)^2}$$ Equation 8

$f_2$=normalized flash falloff correction parameter thus, $f_2$ is an unknown parameter. The value used for $f_2$ may be estimated in a number of ways.

First of all, if it is known that the flash was not used in capturing the scene passed to the falloff compensator 10, then the flash falloff compensation function ffcf(x,y)=0 for pixel values $p_{ij}$. This may be accomplished by selecting a large value (such as $1000 \times d_{max}$) for $f_2$.

If the flash was used in the capturing process, then a much lower flash correction parameter $f_2$ is appropriate. For instance, an image with harsh flash falloff may benefit greatly from a flash correction parameter $f_2$ of $1.5 \times d_{max}$. For an example, $d_{max}$ is 1.414, an approximate value of $f_2$ may be 2.1.

Another possibility for obtaining a value for the flash correction parameter $f_2$ is that an operator simply adjusts a slider of a graphical user interface which applies a falloff compensation mask generated with light falloff compensation function with any number of choices for $f_2$. The operator adjusts the slider until he is pleased with the results. The resulting value for the $f_2$ is preserved and input to the lens falloff function generator 30.

In an alternative embodiment of the present invention, a specific function for the flash falloff characteristics may be specified at the time of manufacture of the flash unit. This information, along with the information of whether of not the flash was used on a specific frame, may be used to construct a flash falloff compensation mask. Information of that kind may be provided on some recording areas on the photographic film. The printer reads the information and utilizes it for the calculation of the flash falloff correction parameter $f_2$.

A further possibility to calculate the flash falloff correction parameter $f_2$ is determined from an analysis of the pixel values of the images captured with the same imaging device. All of the images are captured with the same flash fire conditions. In many image capture systems, the scene flash fire condition may be recorded with the scene. In a simple case, the Advanced Photo System records with each scene whether the flash was fired or not. The scenes in a common order where the flash was fired may be used to generate a symmetric average frame, as previously described. A $\cos^4$ surface may be optimally fit to the symmetric average frame by minimizing the squared error between the symmetric average frame and the $\cos^4$ surface. The value of $f_t$ that generates the optimal fit may be used as the flash correction parameter $f_2$ in the flash falloff compensation function ffcf.

The flash falloff compensation function ffcf and the lens falloff compensation function lfcf are fed to an adder 50. Thus, the light falloff compensation function, fcf, is expressed mathematically in equation 9, wherein equation 9 is valid for all pixels of the digital image 2.

$$fcf(x,y) = lfcf(x,y) + ffcf(x,y)$$ Equation 9

In an alternative embodiment of the present invention, the image data metric may be linearly related to exposure of the scene. In this embodiment, the calculation of the light falloff compensation function fcf is shown in equation 10.

$$fcf(x,y) = lfcf(x,y) \times ffcf(x,y)$$ Equation 10 where:

$$lfcf(x, y) = \frac{1}{\cos^4 \Theta}$$

and $$ffcf(x, y) = \frac{1}{\cos^4 \Theta_2}$$

The definitions of $\Theta$ and $\Theta_2$ remain the same as described above, and the selection or determination of $\Theta$ and $\Theta_2$ also remain identical to the above methods.

According to another possibility, the light falloff compensation function, fcf(x,y) may be equal to only the lens falloff compensation function, lfcf(x,y). In order to compensate for flash falloff in this embodiment, the value of $f_2$ is decreased. Thus, in this embodiment, the combination of lens and flash falloff is modeled simply as a more severe case of lens falloff than is actually the case.

In one embodiment of the invention the method for compensating digital images may encompass additional steps to provide an output of an image, which is compensated for light falloff. The inventive method comprises several steps. At first, providing a plurality of pixel values, which are generated from at least one conventional photographic frame or digital image. Also a light falloff compensation function fcf is provided. The light falloff compensation function fcf is constituted by a two-dimensional function (see Equation 1 or 5). The equations include both an unknown parameter f. The specification above shows numerous possibilities for generating, determining or choosing a value for the so-called light falloff correction parameter. According to the selection of the light falloff correction parameter and the light falloff compensation function fcf, a compensation value may be generated for each pixel value of the original image. In order to further improve the outcome of the compensation for light falloff, a compensation for non-linearities in the response of the imaging device is carried out. The correction for non-linearities in the response of the imaging device may be necessary. A method of correcting for the non-linearities in the response of photographic film may be implemented if the digital image is of film origin. Such a method is described in U.S. Pat. No. 5,134,573 by Goodwin. Such a method is performed prior to the application of the light falloff compensation mask.

A further step of the inventive method is to estimate balance and tonal modifications, which are required by a digital image. There are also two modifications. Firstly, the application of the light falloff compensation mask is performed prior to estimating the balance of the digital image. This balance could for instance be obtained with an automatic exposure determination algorithm (such as are used in high speed optical printers or in a Photo-CD scanner, see for example U.S. Pat. No. 4,945,406). In the preferred embodiment, the desired level of exposure is determined from an image which been modified by the falloff correction. Secondly, the application of the light falloff compensation mask is performed prior to estimating the tonal modifications required by the digital image. The contrast of the image may be estimated by an automatic algorithm. In addition, the contrast of the digital image may likewise be modified to a preferred level of contrast. An example of an algorithm that estimates image contrast and provides a means of adjusting the contrast of the image is described in U.S. Pat. No. 5,822,453, by Lee and Kwon. In the preferred embodiment, such an algorithm would operate on an image which has been modified by the falloff correction.

The invention has been described in detail with particular reference to certain preferred embodiments thereof, but it will be understood that variations and modifications can be effected within the spirit and scope of the invention.

| PARTS LIST | |
|---|---|
| 2 | digital image |
| 3 | film frame |
| 4 | falloff compensated image |
| 5 | center of the digital image |
| 8 | left hand corner |
| 10 | falloff compensator |
| 12 | filmroll |
| 14 | digitizing device |
| 16 | rendering device |
| 20 | falloff mask generator |
| 30 | lens falloff function generator |
| 40 | flash falloff function generator |
| 41 | sensor |
| 42 | center |
| 54 | corner of film or image sensor |
| 56 | optical axis |
| 60 | upper right hand corner |
| 61 | horizontal axis of $\overline{F_1}$ |
| 62 | vertical axis of $\overline{F_1}$ |
| 65 | pixel value |
| $\Theta_{max}$ | angle in each corner |
| $L(\Theta_{max})$ | Exposure in the corners of the film frame |
| $L(0)$ | exposure in the center |
| f | focal length of the lens/light falloff correction value |
| $f_2$ | flash falloff correction parameter |
| $f_{sub}$ | sub-sample factor |
| c | diagonal distance |
| d | distance from the center of the digital image |
| lfcf | lens falloff compensation function |
| ffcf | flash falloff compensation function |
| fcf | falloff compensation function |
| $F_1(x,y)$, $F_2(x,y)$, . . . , $F_n(x,y)$ | frames on one film roll |
| $\overline{F_1}$ | first average frame |
| $\overline{F_2}$ | second average frame |
| $\overline{F_3}$ | third average frame |
| $\overline{F_4}$ | fourth average frame |
| $\overline{F_S}$ | symmetric average frame |
| $P_{ij}$ | pixel value of the digital image |
| x | x-direction of the digital image |
| y | y-direction of the digital image |
| $x_{max}$ | maximum dimension in x-direction |
| $y_{max}$ | maximum dimension in y-direction |

What is claimed is:

1. A method for compensating at least one digital image for light falloff comprising the steps of
    providing a plurality of pixel values for each of at least one digital image of a scene;
    providing a light falloff compensation function;
    determining a light falloff correction parameter by an analysis of the pixel values of the digital image of the scene;
    using the light falloff compensation function and the light falloff correction parameter to generate a individual compensation value for at least one pixel value; and
    applying the individual compensation value to at least one pixel value.

2. A method as recited in claim 1, wherein the pixel values represent log exposure and the step of applying the individual compensation value to each pixel value is additive.

3. A method as recited in claim 1, wherein the pixel values represent linear exposure and the step of applying the individual compensation value to each pixel value is multiplicative.

4. A method as recited in claim 1, wherein the step of determining the light falloff correction parameter is further related to a focal length of a digital image capture lens.

5. A method as recited in claim 1, wherein the step of determining the light falloff correction parameter is further related to a focal length of a typical optical photographic printer.

6. A method as recited in claim 1, wherein the step of determining the light falloff correction parameter is further related to a format of a photographic film from which the at least one digital image is generated from.

7. A method as recited in claim 1, wherein the step of determining the light falloff correction parameter is further related to a camera type which is used to take the picture from which the at least one digital image is generated.

8. A method as recited in claim 7 wherein the camera type comprises a single use camera with a 35 mm film, a single use camera of the Advanced Photo System, a view finder camera for a 35 mm film, a view finder camera of the Advanced Photo System, a single lens reflex camera with a 35 mm film, a single lens reflex camera of the Advanced Photo System, a point and shoot camera with 35 mm film or a point and shoot camera of the Advanced Photo System.

9. A method as recited in claim 1, wherein the step of determining the light falloff correction parameter is carried out by an analysis of the pixel values of a plurality of images, including the digital image, captured with the same camera.

10. A method as recited in claim 9, wherein all of the images are captured with the same flash fire conditions.

11. A method as recited in claim 1, further comprising the step of compensating for non-linearities in the response of a camera used to generate the digital image prior to applying the individual compensation value to at least one pixel value.

12. A method as recited in claim 1, comprises the additional step of estimating balance and tonal modifications to be applied to the digital image.

13. A method as recited in claim 12, wherein the step of applying the individual compensation value is performed prior to estimating the balance of the digital image.

14. A method as recited in claim 12, wherein the step of applying the individual compensation value is performed prior to estimating tonal modifications to be applied to the digital image.

15. A method for compensating at least one digital image for light falloff comprising the steps of:

providing a plurality of pixel values for each of at least one digital image of a scene;

providing a light falloff compensation function;

determining a light falloff correction parameter by an analysis of the pixel values of the digital image of the scene and a plurality of other images of scenes, captured with the same camera by generating a symmetric average frame $\overline{F}_S$ from the plurality of images, and determining the light falloff correction parameter by performing a best fit between the symmetric average frame and the light falloff compensation function;

using the light falloff compensation function and the light falloff correction parameter to generate an individual compensation value for at least one pixel value; and applying the individual compensation value to at least one pixel value.

* * * * *